United States Patent
Imai et al.

(10) Patent No.: US 7,961,378 B2
(45) Date of Patent: Jun. 14, 2011

(54) WAVELENGTH CONVERSION LIGHT SOURCE APPARATUS AND WAVELENGTH CONVERSION METHOD

(75) Inventors: Shinichi Imai, Tokyo (JP); Yoshiharu Urata, Saitama (JP)

(73) Assignees: Megaopto Co., Ltd, Wako (JP); Kabushiki Kaisha Toshiba, Tokyo (JP); NEC Corporation, Tokyo (JP)

( * ) Notice: Subject to any disclaimer, the term of this patent is extended or adjusted under 35 U.S.C. 154(b) by 0 days.

(21) Appl. No.: 12/611,456

(22) Filed: Nov. 3, 2009

(65) Prior Publication Data

US 2010/0128343 A1    May 27, 2010

(30) Foreign Application Priority Data

Nov. 27, 2008    (JP) .................................. 2008-301840

(51) Int. Cl.
*G02F 2/02* (2006.01)
*H01S 3/10* (2006.01)

(52) U.S. Cl. ............. 359/326; 359/328; 372/21; 372/22

(58) Field of Classification Search ........................ None
See application file for complete search history.

(56) References Cited

U.S. PATENT DOCUMENTS

| 7,539,222 B2 * | 5/2009 | Matsuki .......................... 372/21 |
| 2004/0240493 A1 * | 12/2004 | Uto et al. ........................ 372/22 |
| 2005/0105082 A1 * | 5/2005 | Wada et al. ................. 356/239.2 |
| 2008/0219302 A1 * | 9/2008 | Nakayama et al. ............. 372/21 |

FOREIGN PATENT DOCUMENTS

| JP | 7-36072 | 2/1995 |
| JP | 10-268367 | 10/1998 |
| JP | 2000-252570 | 9/2000 |
| JP | 2001-177165 | 6/2001 |
| JP | 2003-46173 | 2/2003 |
| JP | 2004-22946 | 1/2004 |
| JP | 4109869 | 4/2008 |

OTHER PUBLICATIONS

Office Action issued Aug. 31, 2010, in Japan Patent Application No. 2008-301480 (with English-language Translation).
"Coherent laser catalog in 2001", Coherent Japan, Inc. Laser Division, Laser products guide, 2001/2002, 4 pages.

* cited by examiner

*Primary Examiner* — Hemang Sanghavi
(74) *Attorney, Agent, or Firm* — Oblon, Spivak, McClelland, Maier & Neustadt, L.L.P.

(57) ABSTRACT

A wavelength conversion light source apparatus includes a fundamental wave light source configured to emit a fundamental wave, a nonlinear crystal configured to convert a wavelength of the fundamental wave by being irradiated with the fundamental wave and making the fundamental wave pass therethrough, and a movement unit configured to place the nonlinear crystal thereon and continuously move the nonlinear crystal within a plane, where a phase matching condition is not violated, so that a passage path of the fundamental wave passing through the nonlinear crystal is changed.

20 Claims, 9 Drawing Sheets

Related Art

FIG. 11

Related Art

FIG. 12

WAVELENGTH CONVERSION LIGHT SOURCE APPARATUS AND WAVELENGTH CONVERSION METHOD

CROSS-REFERENCE TO RELATED APPLICATION

This application is based upon and claims the benefit of priority from the prior Japanese Patent Application No. 2008-301840 filed on Nov. 27, 2008 in Japan, the entire contents of which are incorporated herein by reference.

BACKGROUND OF THE INVENTION

1. Field of the Invention

The present invention relates to a wavelength conversion light source apparatus and a wavelength conversion method, and for example, relates to a light source apparatus which emits light in the ultraviolet region, such as illumination light used for inspecting a pattern defect of a target object in manufacturing semiconductors and to a wavelength conversion method.

2. Description of Related Art

In recent years, with high integration and large capacity of large scale integrated (LSI) circuits, the line width (critical dimension) required for circuits of a semiconductor element is becoming narrower and narrower. The semiconductor element is manufactured by exposing (transferring) a pattern onto a wafer to form a circuit by a reduced projection exposure apparatus, known as a stepper, while using an original or "master" pattern with a circuit pattern formed thereon. (The original pattern is also called a mask or a reticle, and hereinafter generically referred to as a mask). Therefore, in manufacturing a mask for transferring such a fine circuit pattern onto a wafer, a pattern writing apparatus capable of writing or "drawing" fine circuit patterns needs to be employed. Pattern circuits may be written directly onto a wafer by the pattern writing apparatus. A pattern writing apparatus uses electron beams or laser beams for writing is under development.

Since the LSI manufacturing requires a tremendous amount of manufacturing cost, it is crucial to improve its yield. However, as represented by a 1 gigabit DRAM (Dynamic Random Access Memory), the order of a pattern constituting an LSI has been changing from submicron to nanometer dimensions. One of major factors that decrease the yield of the LSI manufacturing is a pattern defect of a mask used when exposing (transferring) a fine pattern onto a semiconductor wafer by the photolithography technology. In recent years, with miniaturization of an LSI pattern formed on a semiconductor wafer, dimensions of defects to be detected have become extremely small. Thus, a pattern inspection apparatus for inspecting defects of a mask for exposure used in manufacturing LSI needs to be highly accurate.

Meanwhile, with development of multimedia technology, the size of Liquid Crystal Display (LCD) substrates is becoming larger, e.g. 500 mm×600 mm or greater, and the size of a pattern such as a Thin Film Transistor (TFT) or the like formed on the liquid crystal substrate is becoming finer. Therefore, it is increasingly required that an extremely small defect of a pattern should be inspected in a large range. For this reason, development of a pattern inspection apparatus which efficiently and short-timely inspects defects of a pattern of a large area LCD and of a photomask used in manufacturing the large area LCD is urgently required.

As to a conventional pattern inspection apparatus, it is known that an optical image obtained by imaging a pattern formed on a target object or "sample", such as a lithography mask, is compared with design data or an optical image obtained by imaging an identical pattern on the target object. For example, the following is known as pattern inspection methods: "die to die inspection" method that compares data of optical images of identical patterns at different positions on the same mask, and "die to database inspection" method that inputs, into an inspection apparatus, writing data converted from pattern-designed CAD data to a format for input to the writing apparatus when writing a pattern on a mask, generates a reference image based on the input writing data, and compares the generated reference image with an optical image serving as measurement data obtained by capturing an image of the pattern. According to the inspection method using such inspection apparatus, a target object is placed on a stage so that a light flux may scan the object by the movement of the stage. Specifically, the target object is irradiated with a light flux by an illumination apparatus and an illumination optical system. Light transmitted through the target object or reflected therefrom is focused on a sensor through the optical system. An image captured by the sensor is transmitted as measurement data to a comparison circuit. In the comparison circuit, after position alignment of the images, the optical image and the reference image are compared in accordance with an appropriate algorithm. If the images do not match, it is judged that a pattern defect exists.

As an illumination light of a pattern inspection apparatus which inspects a defect of a fine pattern as described above, it becomes necessary to use light in the ultraviolet region. Then, for generating an ultraviolet light, a wavelength conversion light source apparatus is needed which performs wavelength conversion by letting a fundamental wave pass through a nonlinear crystal to generate a light with a shorter wavelength.

However, if a nonlinear crystal is continuously irradiated with ultraviolet rays for a long time, optical damage will occur on the surface of the nonlinear crystal, and then a wavelength converted output (power of an ultraviolet ray having a converted wavelength) will be reduced. Therefore, when occurrence of optical damage on the nonlinear crystal surface is noticed, conventionally, the position of light irradiated onto the nonlinear crystal is shifted.

Figure 11:
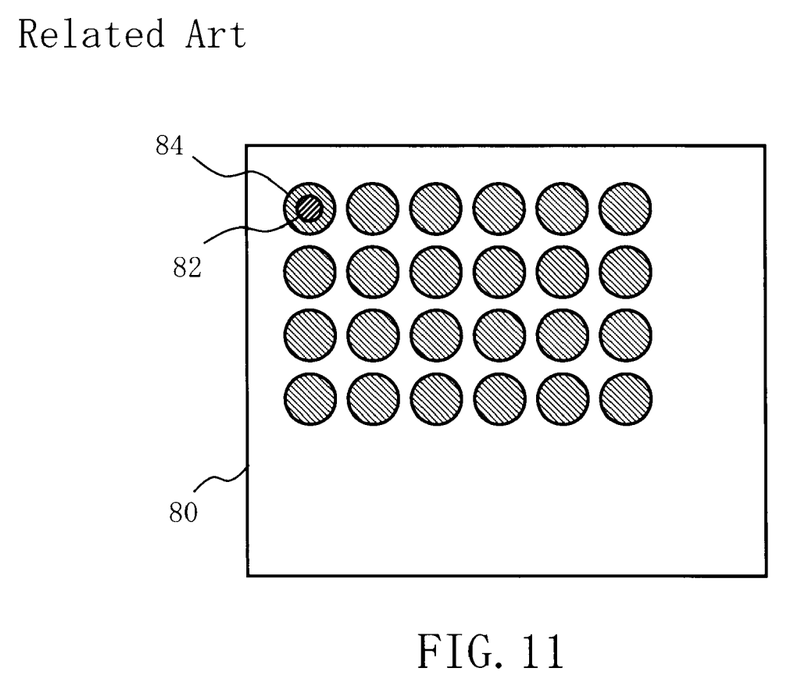
FIG. 11 is a schematic diagram for explaining how to shift an irradiated position concerned.

FIG. 11 is a schematic diagram showing how to shift an irradiated position concerned. FIG. 11 shows the surface of a nonlinear crystal 80, which is irradiated with a fundamental wave, for converting a wavelength. In the figure, a spot size 82 indicates a size including 86% of the energy of a radiating fundamental wave. A region 84 indicates a size having a diameter twice as long as that of the spot size and including 99.7% of the energy of the radiating fundamental wave. If the fundamental wave continuously irradiates a certain point for a long time, the optical damage mentioned above occurs not only in the spot size 82 but also in the entire region 84 being larger than the spot size. Therefore, even when the fundamental wave passes through the region 84, a wavelength converted output will be reduced.

Figure 12:
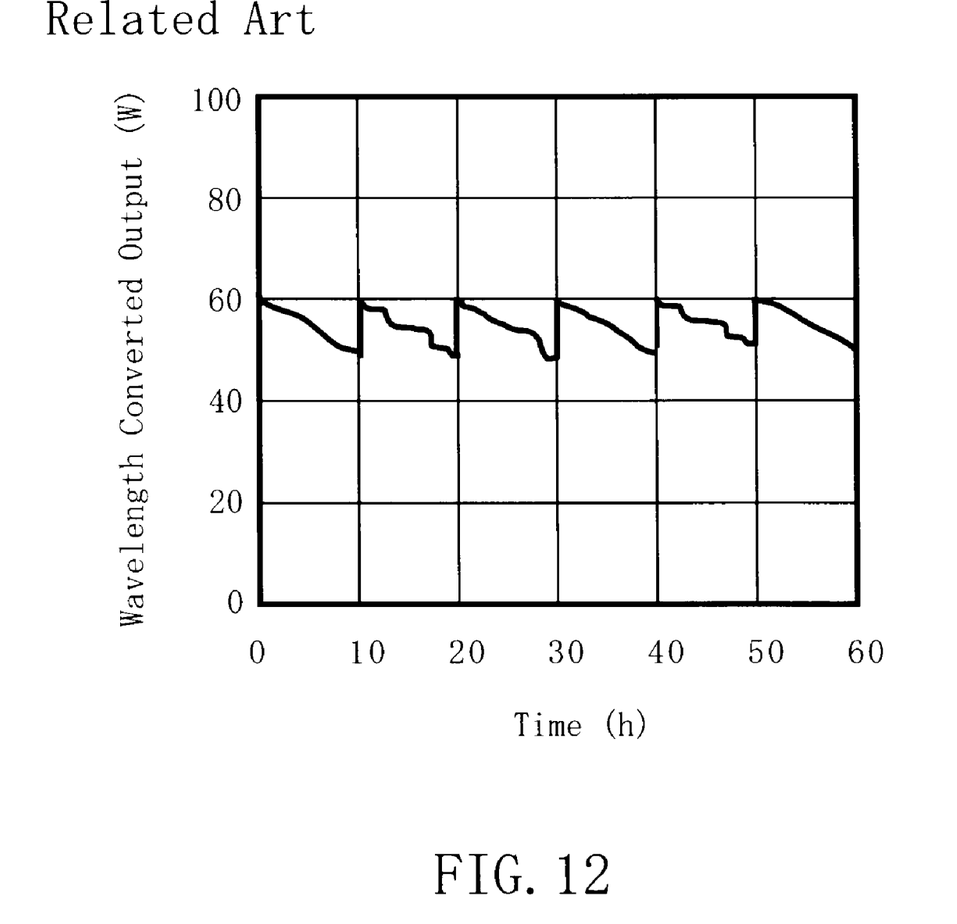
FIG. 12 shows a relation between a wavelength converted output and time concerned.

FIG. 12 shows a relation between a wavelength converted output and time concerned. As mentioned above, when a certain point is continuously irradiated with a fundamental wave for along time, the wavelength converted output will decrease. As shown in the example of FIG. 12, the wavelength converted output gradually decreases as time passes from the irradiation starting. Therefore, as a conventional usage, the whole crystal which is kept in a phasing state is moved in parallel every 10 hours to a position where there is no influence of the deterioration as shown in FIG. 11. Thus, it has been repeated to restore the wavelength converted output by shifting the irradiation position of a fundamental wave every 10 hours, for example, and to continue the irradiation until the surface of the crystal deteriorates. Therefore, as shown in FIG. 12, the output characteristic shows a shape like a saw blade to return the output to the original intensity every 10 hours, for example. The continuous radiation time varies depending upon the type etc. of the nonlinear crystal, and it is acceptable to move the irradiated position every 24 hours, for example.

Conventionally, a method is known in which a transportation means (crystal shifter function) is provided in the mount of the wavelength conversion nonlinear crystal in order to deviate the light path from a deteriorated part of the crystal. For example, a crystal shifter is built in some DUV light source products (for example, refer to a coherent laser catalog in 2001). Further, a proposal has been made to change a light path in the crystal in order to inhibit the change of the output power and the beam shape (refer to, e.g., Japanese Patent Application Laid-Open (JP-A) No. 2000-252570), and however, its substantial function is quite the same as that of the crystal shifter.

When a KTP crystal of 5 square mm, for example, is used as the nonlinear crystal 80, since the edge cannot be used, an effective section is 4 square mm. If specifying the spread angle of the fundamental wave to be 0.5 mrad (full angle) and the focal length of the condenser lens to be 250 mm, the diameter of the spot size on the KTP crystal will be 0.125 mm. For moving the crystal in parallel to a position having no influence of crystal degradation caused by the optical damage mentioned above, it is necessary to perform parallel translation of three times the spot size 82. That is, it is needed to move 0.375 mm every 10 hours. In the effective region of 4 square mm, it is possible to move the crystal to eleven points in lengthwise and crosswise. In the case of all the eleven points being used, if the output is restored every 10 hours as shown in FIG. 11, the crystal has to be exchanged after being continuously used for 1210 hours (for about 50 days).

When the inventors observed the surface of the crystal after using it in the above way, it was found out that there was a trace after being used at each point and an influence layer caused by the degradation had been formed on the surface. Because of this, it was also found out that the crystal has to be exchanged when all the points have been used.

Conventionally, as mentioned above, performance degradation is prevented by avoiding deteriorated points by performing a periodical step movement further larger than a region which is larger than the spot size of a fundamental wave. However, in such an operation, since the fundamental wave radiates the same position for a longtime, a wavelength-converted light is generated, thereby producing optical damage at the position used. Then, a trace of the radiation remains and a poor surface whose influence layer part is larger than the spot size is produced on the crystal surface. Therefore, there is a problem that one continuous radiation makes a broad range unusable and then, in shifting the irradiated position, the region to be used is limited depending upon the area of the surface of the crystal. Moreover, it is also a problem that, because of temporal (time-course) degradation of each position, the output characteristic after shifting changes as time passes.

In addition, as to a nonlinear crystal, there is disclosed a technique in which degradation of a crystal is restored by performing an annealing treatment under certain conditions before incurring optical damage on the surface of the crystal (refer to, e.g., Japanese Patent No. 4109869).

BRIEF SUMMARY OF THE INVENTION

In accordance with one aspect of the present invention, a wavelength conversion light source apparatus includes a fundamental wave light source configured to emit a fundamental wave, a nonlinear crystal configured to convert a wavelength of the fundamental wave by being irradiated with the fundamental wave and making the fundamental wave pass therethrough, and a movement unit configured to place the nonlinear crystal thereon and continuously move the nonlinear crystal within a plane, where a phase matching condition is not violated, so that a passage path of the fundamental wave passing through the nonlinear crystal is changed.

In accordance with another aspect of the present invention, a wavelength conversion light source apparatus includes a fundamental wave light source configured to emit a fundamental wave, a nonlinear crystal configured to convert a wavelength of the fundamental wave by being irradiation with the fundamental wave and making the fundamental wave pass therethrough, and a movement unit configured to place the nonlinear crystal thereon and move the nonlinear crystal by a distance equal to or less than a spot size of the fundamental wave per movement within a plane, where a phase matching condition is not violated, so that a passage path of the fundamental wave passing through the nonlinear crystal is changed.

Moreover, in accordance with another aspect of the present invention, a wavelength conversion method includes converting a wavelength of a fundamental wave by irradiating a nonlinear crystal with the fundamental wave and by making the fundamental wave pass through the nonlinear crystal, and while the nonlinear crystal is irradiated with the fundamental wave, continuously moving the nonlinear crystal within a plane, where a phase matching condition is not violated, so that a passage path of the fundamental wave passing through the nonlinear crystal is changed.

Furthermore, in accordance with another aspect of the present invention, a wavelength conversion method includes converting a wavelength of a fundamental wave by irradiating a nonlinear crystal with the fundamental wave and by making the fundamental wave pass through the nonlinear crystal, and while the nonlinear crystal is irradiated with the fundamental wave, moving the nonlinear crystal by a distance equal to or less than a spot size of the fundamental wave per movement within a plane, where a phase matching condition is not violated, so that a passage path of the fundamental wave passing through the nonlinear crystal is changed.

DETAILED DESCRIPTION OF THE INVENTION

Hereafter, a wavelength conversion light source apparatus in which the life of a nonlinear crystal used for wavelength conversion can be lengthened, and a method thereof will be described in each Embodiment.

Embodiment 1

Figure 1:
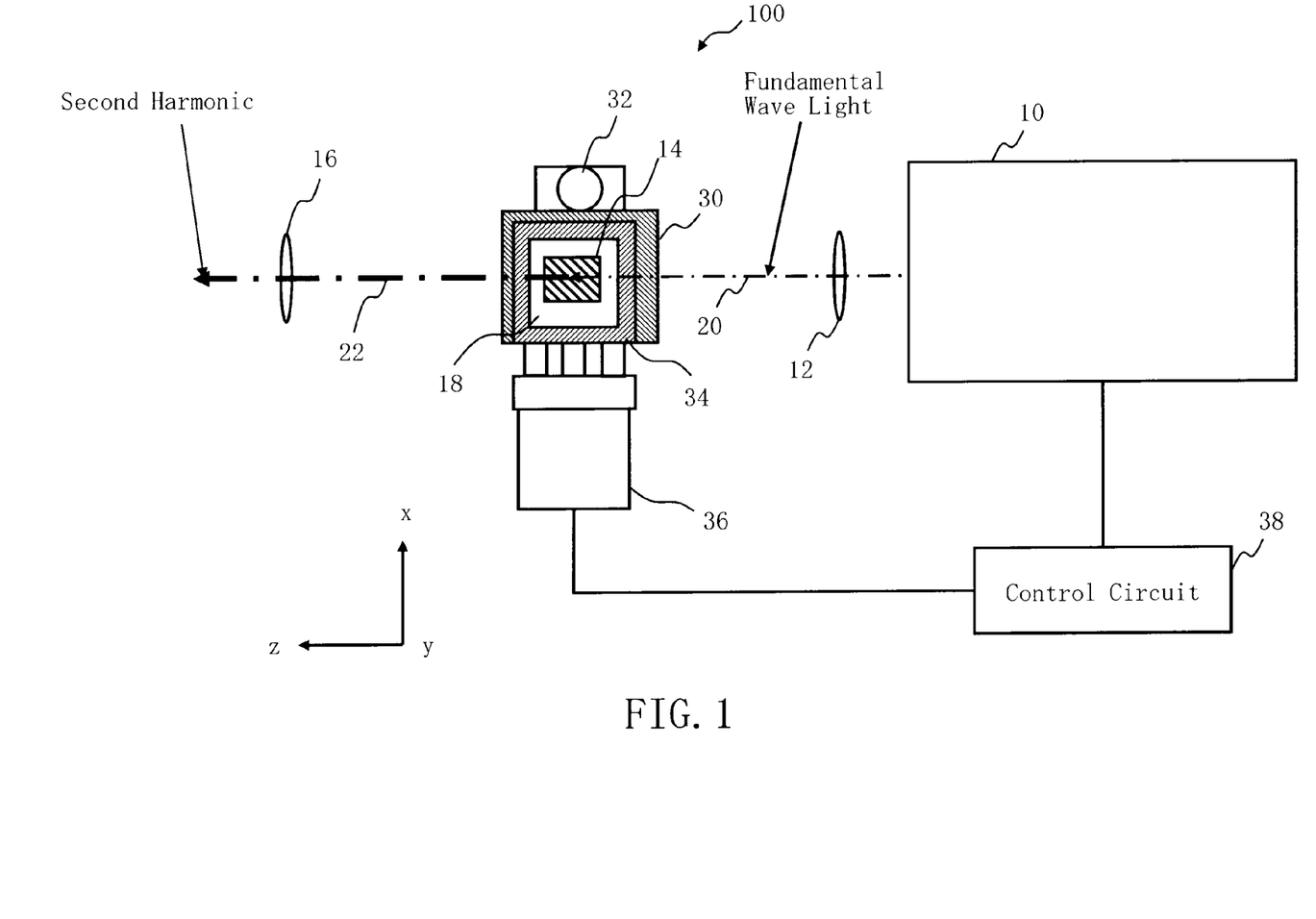
FIG. 1 is a schematic diagram showing the structure of a wavelength conversion light source apparatus according to Embodiment 1.

FIG. 1 is a schematic diagram showing the structure of a wavelength conversion light source apparatus according to Embodiment 1. In FIG. 1, a wavelength conversion light source apparatus 100 includes a fundamental wave light source 10, a condenser lens 12, a nonlinear crystal 14, a collimating lens 16, a heat sink 18, a y-axis stage 30, a y-axis motor 32, an x-axis stage 34, an x-axis motor 36, and a control circuit 38. The fundamental wave light source 10 includes a resonator (not shown) inside it. Therefore, the wavelength conversion light source apparatus 100 shown in FIG. 1 serves as an example of a light source apparatus which performs wavelength conversion outside the resonator. The fundamental wave light source 10, the y-axis motor 32, and the x-axis motor 36 are controlled by the control circuit 38. Moreover, the heat sink 18 is configured in the y-axis stage 30 and x-axis stage 34, and the nonlinear crystal 14 is arranged in the heat sink 18. The heat sink 18 makes the temperature of the crystal have a good heat conduction and be constant. For example, the crystal is mounted on a copper block in which a heater is embedded on the Peltier device. Thus, a crystal element may be mounted on a copper block, or it is preferable, while keeping a light path, to embed a crystal in a copper block of a slot-like shape and embed a heater in the copper block. Alternatively, it is also preferable to provide a channel instead of the heater. In the case of emitting a coherent light with a wavelength of 532 nm as a second harmonic while using a KTP crystal as a nonlinear crystal 14, it is preferable to control the temperature of a copper block to be about 100 degrees C.

The fundamental wave light source 10 emits a fundamental wave 20. The fundamental wave 20 output from the fundamental wave light source 10 irradiates the nonlinear crystal 14 for wavelength conversion placed under the phase matching conditions of generation of the second harmonic by using the condenser lens 12. The nonlinear crystal 14 irradiated and penetrated with the fundamental wave 20 converts the wavelength of the fundamental wave 20 in order to emit a second harmonic 22. The emitted second harmonic 22 is returned to a parallel light by the collimating lens 16 and is output outside. By this, it is possible to obtain an ultraviolet light whose wavelength has been converted.

For example, it is preferable to use Nd:YAG laser of an average output 100 W, a pulse width 100 ns and a repeat frequency 5 kHz, as the fundamental wave light source 10. When this laser is used, 50 W of light with a wavelength of 532 nm can be obtained as a second harmonic output. A KTP crystal can be used as the nonlinear crystal 14 for such wavelength conversion.

In addition, for example, when CLBO is used as the nonlinear crystal 14, if 532 nm light being the second harmonic of Nd:YAG laser is used as the fundamental wave 20, 266 nm light being the second harmonic of the 532 nm light is emitted by irradiating the nonlinear crystal 14 with the fundamental wave 20. Alternatively, when BBO is used as the nonlinear crystal 14, it is preferable to generate a third harmonic of an Alexandrite laser, namely to generate a sum frequency of a second harmonic of an Alexandrite laser and a fundamental wave.

If continuously irradiating the nonlinear crystal 14 with the fundamental wave 20 as it is, a wavelength converted output decreases as time passes because degradation caused by optical damage occurs on the crystal surface as mentioned above. Therefore, in Embodiment 1, the position of irradiation of the fundamental wave 20 onto the nonlinear crystal 14 is moved as follows: That is, the nonlinear crystal 14 is moved by continuous movement within a plane where the phase matching condition is not violated so that the passage path of the fundamental wave 20 passing through the nonlinear crystal 14 may be changed. Alternatively, the nonlinear crystal 14 is moved by step movement by a distance equal to or less than the spot size of the fundamental wave 20 per movement within a plane where the phase matching condition is not violated. The y-axis stage 30 moves the nonlinear crystal 14 in the y-axis direction by the drive of the y-axis motor 32 controlled by the control circuit 38, and the x-axis stage 34 moves the nonlinear crystal 14 in the x axis direction by the drive of the x-axis motor 36. Therefore, the y-axis stage 30 and the x-axis stage 34 are examples of a movement unit for moving the nonlinear crystal 14. In this case, the optical axis direction is defined as the z-axis, and directions perpendicularly intersect with the z-axis are the x-axis and the y-axis.

At this point, the inventors found out that optical damage does not occur on the surface of the crystal by continuously moving the nonlinear crystal 14. Moreover, similarly, it is found out that the wavelength converted output does not decrease even when time passes. Furthermore, it is found out that this phenomenon similarly occurs even in the case of moving the nonlinear crystal 14 by step movement by a distance less the spot size of the fundamental wave 20 per predetermined period.

Figure 2:
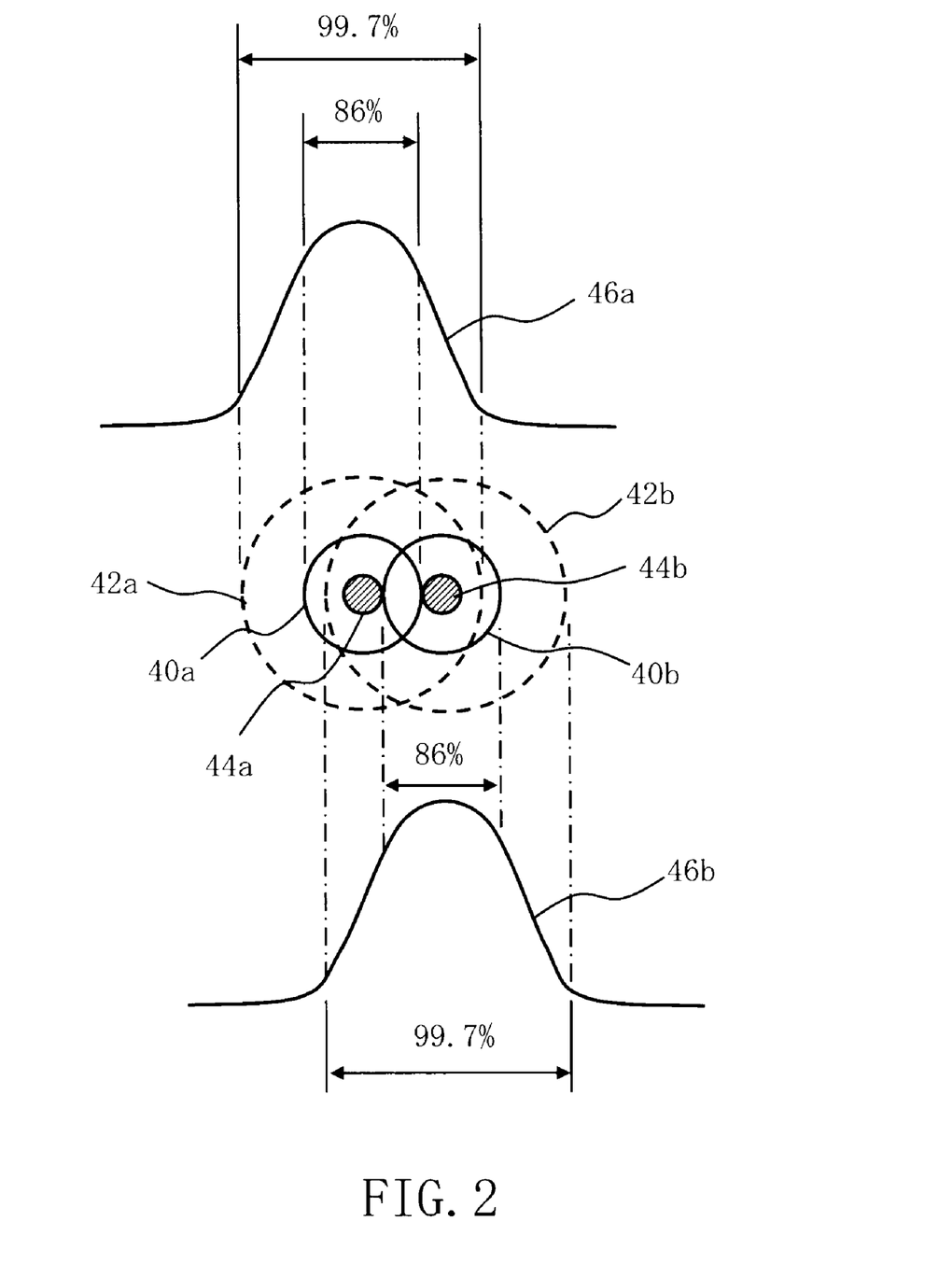
FIG. 2 is a schematic diagram for explaining how to move the irradiation position according to Embodiment 1.

FIG. 2 is a schematic diagram for explaining how to move the irradiation position according to Embodiment 1. First, when the fundamental wave 20 irradiates a certain point, a light path defect 44a inside the nonlinear crystal 14 occurs at the central part of a spot size 40a by the irradiation. The light path defect 44a is assumed to be an electronic defect or color center generation, etc., because there is no scar, such as a physical crack, unlike the optical damage produced on the crystal surface. That is, the light path defect 44a inside the crystal occurs in the range smaller than the spot size 40a including 86% of the energy of the fundamental wave 20. In other words, the light path defect 44a inside the crystal first occurs near the top of an energy intensity distribution 46a of the fundamental wave 20, namely first occurs at the portion where the energy intensity is very high. Even more, the light path defect 44a inside the crystal does not occur in a region 42a including 99.7% of the energy of the irradiating fundamental wave. At this stage, the temporal decrease of the wavelength converted output has not started yet. Then, it can be assumed that if the irradiation is further continued from this state, the wavelength converted output will begin decreasing as time passes even though the light path defect 44 exists inside the crystal. Furthermore, if the irradiation is continued and exceeds a threshold value, optical damage on the surface of the crystal will occur and spread at an accelerated pace from the produced point of the light path defect 44a. Consequently, a range equal to or greater than twice as large as the spot size becomes unusable like a conventional case. Then, in Embodiment 1, an accelerating spread of the unusable region is prevented by shifting the position of the irradiation of the fundamental wave 20 onto the nonlinear crystal 14, before the temporal decrease of the wavelength converted output (power of the fundamental wave 20 having a converted wavelength) begins and the crystal surface suffers from the optical damage. Thereby, it is possible to prevent the temporal decrease of the wavelength converted output and to make the unusable region on the surface of the nonlinear crystal 14 small.

Furthermore, the inventors found out that, depending upon the type of the nonlinear crystal 14 and conditions in manufacturing the nonlinear crystal 14, the light path defect 44a is restored when the part of the light path defect 44a produced inside the crystal is irradiated with an energy smaller than energy of around the top of the energy intensity distribution 46b of the fundamental wave 20. That is, the shifting should be performed not by largely moving the irradiation position like a conventional case, but by moving it by a distance less than or equal to the spot size of the fundamental wave 20. By this, the light path defect 44a which was produced by the irradiation before the movement stays within a region 42b including 99.7% of the energy of the fundamental wave after the movement. Further, by this, the part where the light path defect 44a is produced receives radiation of energy weaker than the energy causing the light path defect 44a. Owing to the irradiation of such weak energy, the light path defect 44a inside the crystal can be restored. It is thought that such restoration phenomenon by the weak energy irradiation results from the effect of self-annealing.

The above shows that the output characteristic of the crystal which has been once deteriorated can be restored by annealing after the deterioration if the degree of the deterioration is not so high as to give optical damage to the crystal surface. That is, it is thought that a crystal defect (light path defect), which causes absorption/generation etc., is annealed to be restored by irradiation of the fundamental wave 20 or a wavelength converted light at an early stage before incurring optical damage. Moreover, the inventors have confirmed that this phenomenon is effective not only to the second harmonic generation of Nd:YAG laser by a KTP crystal but to a wavelength conversion by other nonlinear crystals.

The energy used for restoration should just be weaker than the energy causing the light path defect 44a. Therefore, even if the position is within the spot size 40a including 86% of the energy of the fundamental wave 20, it is acceptable as long as the radiating energy is weaker than the energy causing the light path defect 44a. The value of energy used for the restoration varies depending upon the type of the nonlinear crystal 14 and conditions in the manufacture process, etc., and a suitable range may be set for each of values. Based on the setting result, a movement distance of one step, a step waiting time period, and a moving speed of a continuous movement may be set so that such a restoration effect can be acquired. For example, it is preferable for the unit distance of a step movement to be a value from 1 μm to 15 μm.

Although a light path defect 44b inside the crystal similarly occurs in the central part after moving, this defect 44b will be similarly restored by the next movement. As mentioned above, when it is possible to restore the light path defect 44a, exchanging the nonlinear crystal 14 because of the optical damage on the crystal surface, which has been performed conventionally, becomes unnecessary.

It is also preferable to place a partial reflecting mirror (not shown) whose reflectance is 1% at the output side of the second harmonic in order to monitor a wavelength converted output. Then, when the control circuit 38 inputs a monitor value of the output (power) after wavelength conversion and the output after the wavelength conversion begins to decrease as time passes, it is also acceptable to accelerate the moving speed of the nonlinear crystal 14. According to an experiment by the inventors, as to a certain point of the nonlinear crystal 14, when to/hour of a wavelength converted output decreases at the crystal moving speed used conventionally, the decrease of the wavelength converted output can be prevented by enhancing the moving speed to be twice. This moving speed can be controlled by employing an algorithm which finds an optimal speed by varying a speed until the output decrease tendency disappears. As mentioned above, it is also preferable to set the moving speed by using an observation value of a wavelength converted output.

Figure 3:
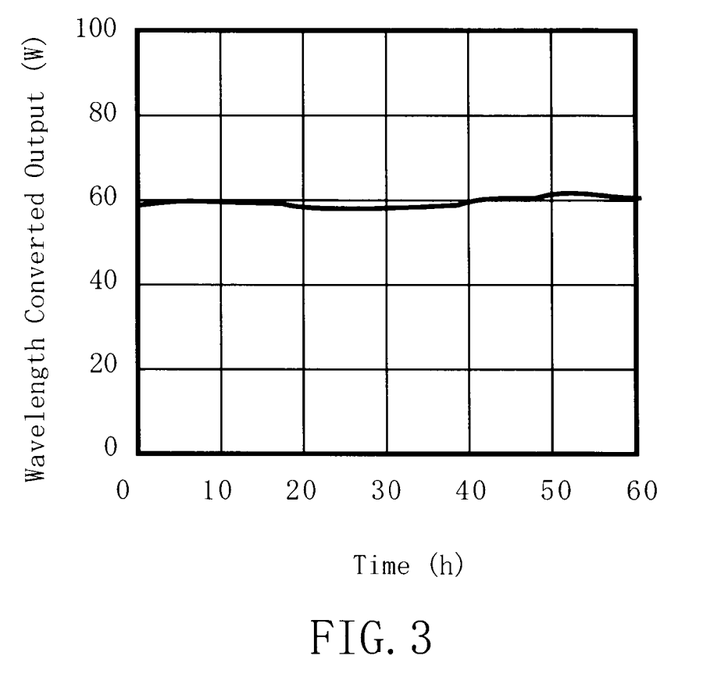
FIG. 3 shows a relation between a wavelength converted output and time according to Embodiment 1.

FIG. 3 shows a relation between a wavelength converted output and time according to Embodiment 1. In the structure shown in FIG. 1, when continuously moving the stage on which the nonlinear crystal 14 is placed every 10 minutes by 0.002 mm of a unit moving distance of the pulse motor, a temporal decrease of the wavelength converted output caused by the KTP crystal used as the nonlinear crystal 14 is hardly seen as shown in the output temporal characteristic in FIG. 3. At this time, no trace of use is observed on the KTP crystal surface.

Figure 4:
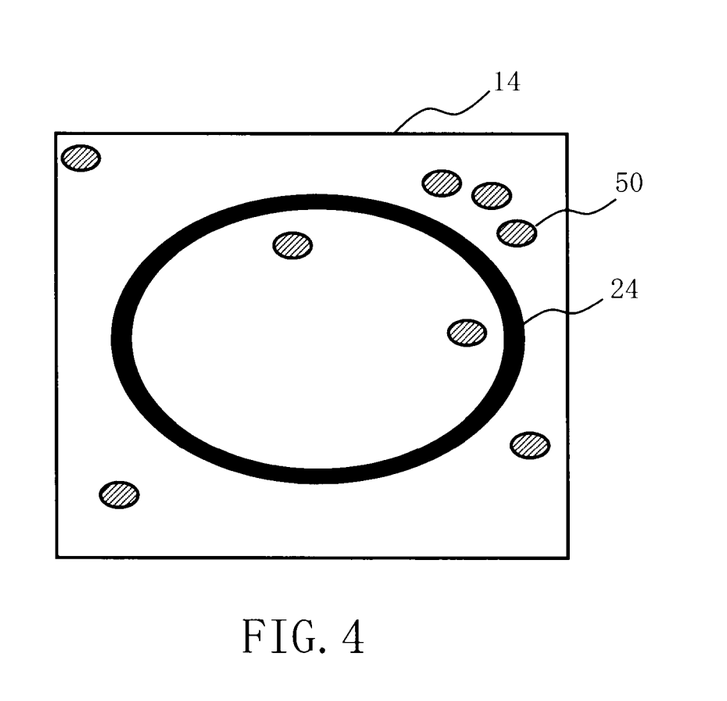
FIG. 4 shows an example of the pathway (track) of an irradiated position on the surface of a nonlinear crystal according to Embodiment 1.

FIG. 4 shows an example of the pathway (track) of an irradiated position on the surface of the nonlinear crystal according to Embodiment 1. When using the nonlinear crystal 14 whose light path defect 44 inside the crystal can be restored as mentioned above, the same position of the nonlinear crystal 14 can be used for wavelength conversion a plurality of times by controlling the crystal placing stage so that a movement pathway 24 of the irradiation position of the fundamental wave 20 may be a closed pathway (track) having no end part, such as an ellipse as shown in FIG. 4. As a result, the life of the nonlinear crystal 14 can be extended greatly. Moreover, for example, when continuously moving the nonlinear crystal 14, it is difficult to make a curve at a steep angle. Therefore, if the movement pathway 24 of the irradiation position of the fundamental wave 20 includes a curved line, such as an ellipse, the continuous movement will be performed easily.

According to an experiment by the inventors, no crystal degradation was observed when the crystal was always moved along the elliptical pathway as shown in FIG. 4. Having no output decrease caused by crystal degradation, the KTP crystal becomes a level of fault resulting from other factors such as the excitation light source, thereby being no longer a consumable component.

Figure 5:
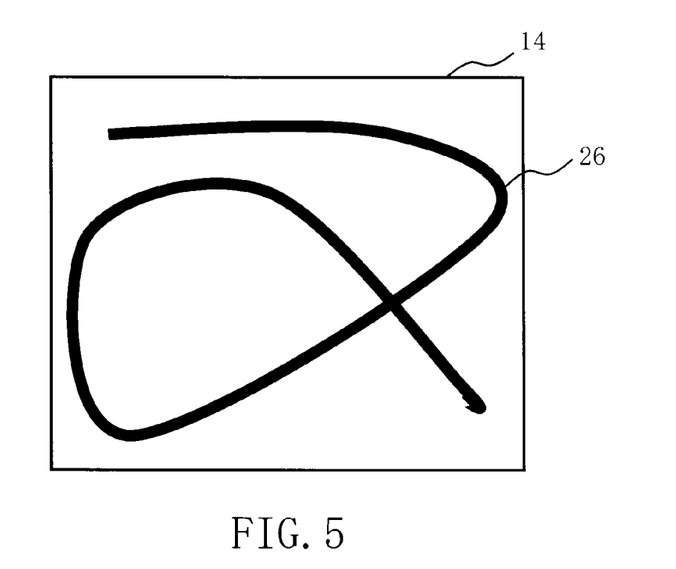
FIG. 5 shows another example of the pathway (track) of an irradiated position on the surface of a nonlinear crystal according to Embodiment 1.

FIG. 5 shows another example of the pathway (track) of the irradiated position on the surface of the nonlinear crystal according to Embodiment 1. If using the nonlinear crystal 14 whose light path defect 44 inside the crystal cannot be restored, it is preferable to control the crystal placing stage, for example, so that a movement pathway 26 of the irradiation position of the fundamental wave 20 may be a line drawn with a single stroke including a curved line as shown in FIG. 5. Moreover, for example, when continuously moving the nonlinear crystal 14, since it is difficult to make a curve at a steep angle, if the movement pathway 24 of the irradiation position of the fundamental wave 20 includes a curved line, the continuous movement will be performed easily. Moreover, in Embodiment 1, even if the nonlinear crystal 14 whose light path defect 44 inside the crystal cannot be restored is used, unlike the conventional case, the unusable portion on the surface of the nonlinear crystal 14 is not twice as large as the spot size. Therefore, it is possible to make the area of the surface of the nonlinear crystal 14 to be used for wavelength conversion larger than the conventional case. Thus, even when a used point is not reused, the life of the nonlinear crystal 14 can be extended longer than the conventional case.

Embodiment 2

The light source apparatus which performs wavelength conversion outside the resonator is described in Embodiment 1, and however, it is not limited to this. In Embodiment 2, there will be described a structure which performs wavelength conversion inside the resonator. Contents except for the below-described points are the same as Embodiment 1.

Figure 6:
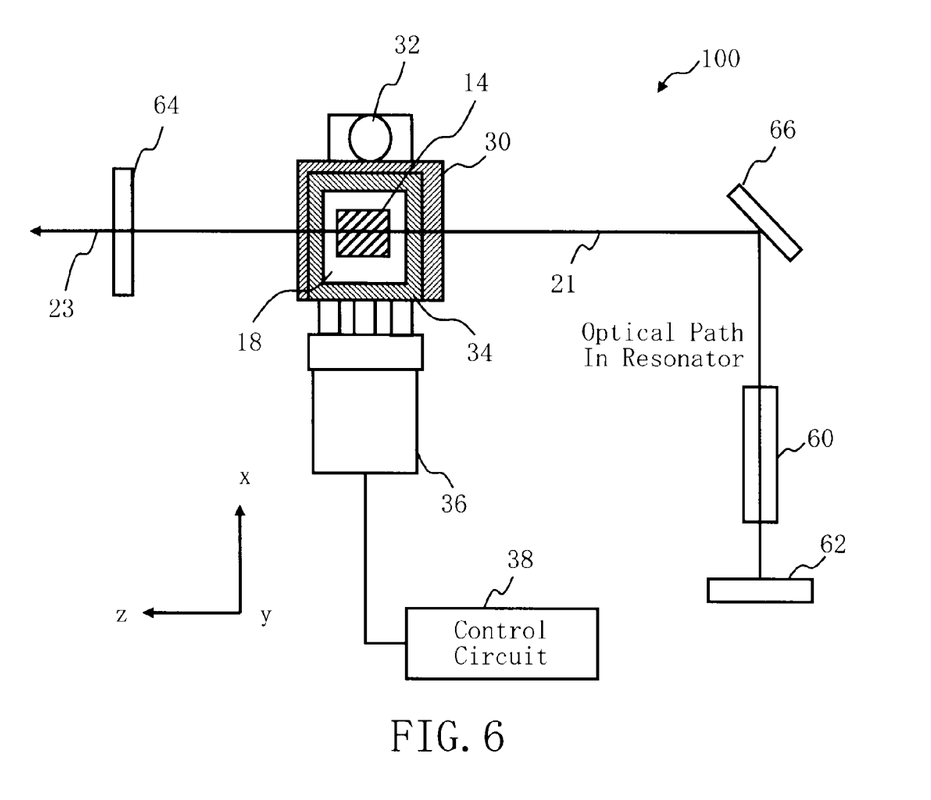
FIG. 6 is a schematic diagram showing the structure of a wavelength conversion light source apparatus according to Embodiment 2.

FIG. 6 is a schematic diagram showing the structure of a wavelength conversion light source apparatus according to Embodiment 2. In FIG. 6, the wavelength conversion light source apparatus 100 includes a laser active medium 60, high reflecting mirrors 62 and 66, an output coupling mirror 64, the nonlinear crystal 14, the heat sink 18, the y-axis stage 30, the y-axis motor 32, the x-axis stage 34, the x-axis motor 36, and the control circuit 38. The resonator is composed of the high reflecting mirrors 62 and the output coupling mirror 64 which are arranged to have a resonator length. The fundamental wave light source is composed of the laser active medium 60, the high reflecting mirrors 62 and 66, and the output coupling mirror 64. The nonlinear crystal 14 is arranged between the high reflecting mirror 62 and the output coupling mirror 64 which structure the resonator. Therefore, the wavelength conversion light source apparatus 100 shown in FIG. 6 serves as an example of the light source apparatus which performs wavelength conversion inside the resonator. Radiating light emitted from the laser active medium 60 resonates between the high reflecting mirror 62 and the output coupling mirror 64 through the high reflecting mirror 66, to be an induced emission light 21. The induced emission light 21 irradiates the nonlinear crystal 14 placed under the phase matching condition of the second harmonic generation. Then, irradiated with the induced emission light 21 being a fundamental wave, the nonlinear crystal 14 makes the induced emission light 21 pass therethrough and converts the wavelength of the induced emission light 21 to generate a second harmonic 23. Then, a part of the generated second harmonic 23 is output from the output coupling mirror 64. By this, it is possible to obtain an ultraviolet light whose wavelength has been converted.

In the case of performing wavelength conversion inside a resonator, if the nonlinear crystal 14 is continuously irradiated with the induced emission light 21 as it is, similar to Embodiment 1, deterioration caused by optical damage occurs on the crystal surface as mentioned above, and the wavelength converted output will decrease as time passes. Also in Embodiment 2, the irradiation position of the induced emission light 21 onto the nonlinear crystal 14 is moved similarly to Embodiment 1. That is, the nonlinear crystal 14 is continuously moved within a plane where the phase matching condition is not violated so that the passage path of the induced emission light 21 passing through the nonlinear crystal 14 may be changed. Alternatively, the nonlinear crystal 14 is moved by step movement by a distance equal to or less than the spot size of the induced emission light 21 per movement within a plane where the phase matching condition is not violated. The method, speed, etc. of the movement are the same as those of Embodiment 1.

As mentioned above, also when performing wavelength conversion in the resonator, the same effect as that of Embodiment 1 can be acquired by moving the nonlinear crystal similarly to Embodiment 1.

Embodiment 3

In Embodiment 1, it is described that the nonlinear crystal is moved so that the movement pathway may become the line as shown in FIGS. 4 and 5. Moreover, this can also be applied to Embodiment 2. However, with respect to homogeneity of the nonlinear crystal 14, it has been found out that there are some deteriorated portions 50 where the wavelength conversion characteristic decreases as shown in FIG. 4 because of the influence of growing the crystal and processing/polishing the crystal as a wavelength conversion element. If setting a movement pathway of an irradiated position without taking this deteriorated portion 50 into consideration, the deteriorated portion 50 may be located on the movement pathway 24 of the irradiated position. If the deteriorated portion 50 is irradiated with the fundamental wave, the wavelength converted output will decrease.

In Embodiment 3, there will be explained the structure in which it is set so that the deteriorated portion 50 where the wavelength conversion characteristic decreases may not be located on the movement pathway of the irradiated position.

Figure 7:
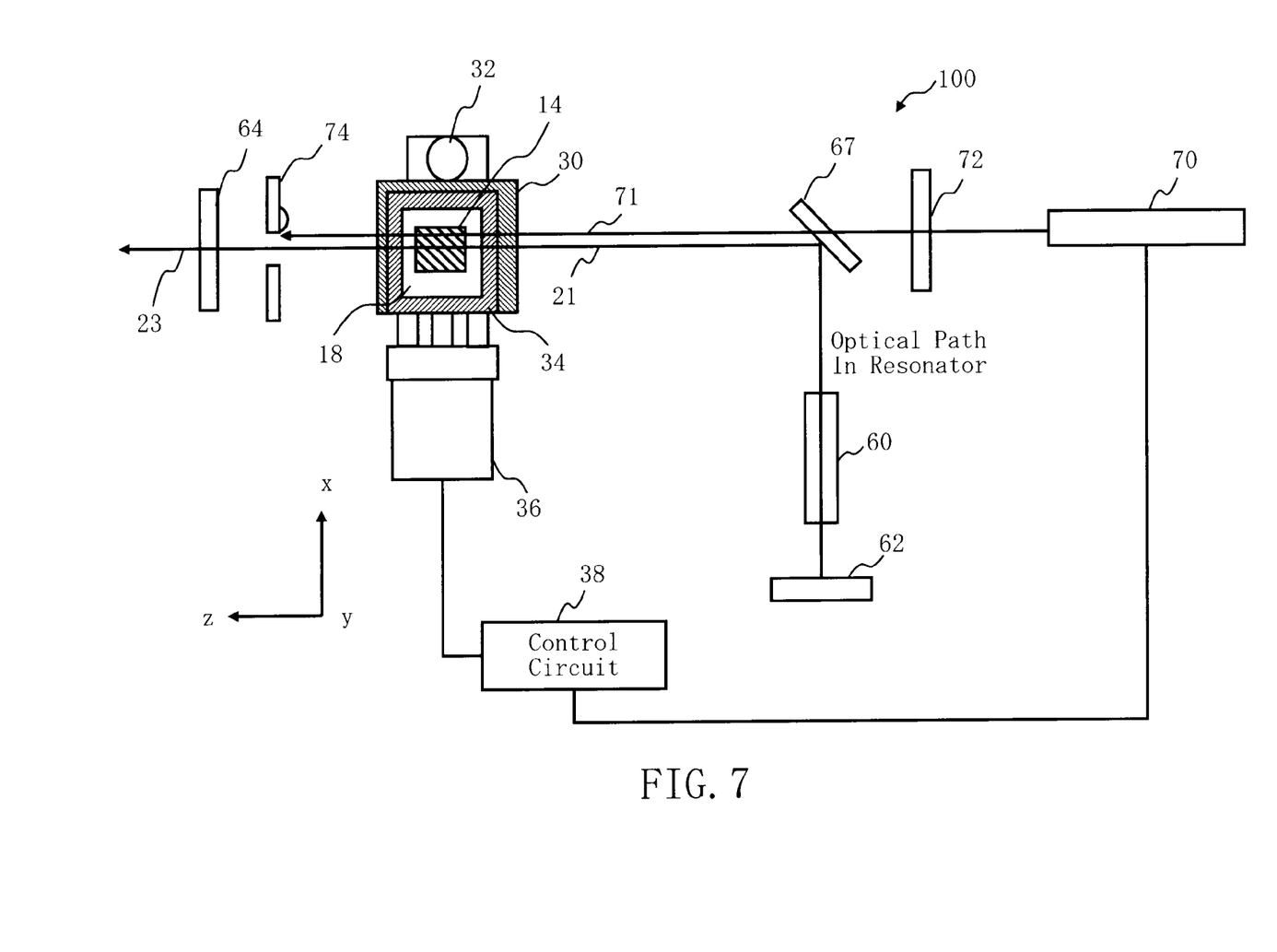
FIG. 7 is a schematic diagram showing the structure of a wavelength conversion light source apparatus according to Embodiment 3.

FIG. 7 is a schematic diagram showing the structure of a wavelength conversion light source apparatus according to Embodiment 3. In FIG. 7, the wavelength conversion light source apparatus 100 is the same as that in FIG. 6 except for the addition of a probe light emission unit 70 (an example of a probe light source), a parallel plate 72, and a scattering light detection monitor 74, and the replacement of the high reflecting mirror 66 with a probe light introducing mirror 67. It should be understood that since the probe light introducing mirror 67 is inside the resonator, a radiating light, the induced emission light 21 and the second harmonic 23 are reflected onto the optical axis in the resonator.

In Embodiment 3, the deteriorated portion 50 of the nonlinear crystal 14, where a wavelength converted output decreases, is specified by irradiating a probe light 71 onto the nonlinear crystal 14. The probe light 71 emitted from the probe light emission unit 70 passes through the parallel plate 72 and the probe light introducing mirror 67 inside the resonator to irradiate the nonlinear crystal 14. When moving the nonlinear crystal 14, if the probe light 71 irradiates the deteriorated portion 50, the probe lights 71 scatters a light to be detected by the scattering light detection monitor 74. Thus, the deteriorated portion 50 where the wavelength conversion characteristic decreases can be specified by regarding a point of a scattering light detected by the scattering light detection monitor 74, as the deteriorated portion 50.

If a laser light of a wavelength unrelated to oscillation of the resonator is used, the probe light 71 will tend to easily detect malfunctions. That is, using Nd doped YAG as an active material, a fundamental wave oscillates at 1064 nm and light of 532 nm is generated as a second harmonic. When a KTP crystal is used as the nonlinear crystal 14, a 630 nm laser diode can be output as the probe light 71. The probe light emission unit 70 of FIG. 7 can be composed by unifying the luminescence unit of the laser diode and the collimator for the output into one.

As the first method, before performing wavelength conversion of a fundamental wave by the wavelength conversion light source apparatus 100, the surface of the nonlinear crystal 14 is scanned with the probe light 71 by moving the stage on which the nonlinear crystal 14 is placed at a speed higher than that in operation. Whether there is a malfunction point or not is investigated using an output light of the probe light 71 from the nonlinear crystal 14, and stage controlling is programmed so that the deteriorated portion 50 may be avoided. For example, in the case of forming an ellipse track as shown in FIG. 4, it is also acceptable to change the major axis and the minor axis of the ellipse before moving to the deteriorated portion 50 in order to avoid a malfunction point. In the case of using a circular track, it is possible to perform a stable wavelength conversion when operating, by changing the radius of the circular track so that the deteriorated portion 50 may be avoided when operating. Furthermore, in the case that a track overlaps with a portion where the wavelength converted output is lower than that of the other portion, it is acceptable to make the crystal moving speed faster only at the portion mentioned above so that the influence thereof may be the minimum. According to an experiment by the inventors, it has been found out that the influence can be minimized by speeding up the crystal moving speed.

Therefore, it is preferable to specify the deteriorated portion 50 of the nonlinear crystal 14 beforehand by scanning using a probe beam and then to set an ellipse track as shown in FIG. 4 not to include the specified portion in the movement pathway of the irradiated position. Owing to this, a stable wavelength conversion can be performed, thereby obtaining a stable output.

Moreover, in the case of an elliptic track as the pathway for example, it is acceptable, before performing wavelength conversion of a fundamental wave in the wavelength conversion light source apparatus 100, to specify the deteriorated portion 50 of the nonlinear crystal 14 beforehand by scanning using the probe light 71, and to change the major axis and the minor axis of the ellipse before moving to the deteriorated portion 50.

Thus, it is acceptable to specify all the deteriorated portions 50 of the nonlinear crystal 14 beforehand by scanning all over the irradiated surface of the nonlinear crystal 14 by using the probe beam 71 before performing wavelength conversion of the fundamental wave in the wavelength conversion light source apparatus 100 by the first method mentioned above, and however, it is not limited to this. As a second method, while performing wavelength conversion of the fundamental wave in the wavelength conversion light source apparatus 100, the deteriorated portion 50 of the nonlinear crystal 14 may be specified in real time.

According to the second method, as shown in FIG. 7, the optical axis of the probe light 71 is shifted (offset) to have a path precedent to the optical axis of the fundamental wave. By controlling the posture of the parallel plate 72, the probe light 71 is always controlled to be at a position precedent to the irradiation position of the fundamental wave. When a scattering light is generated by the precedent probe light 71 and the scattering light is detected by the scattering light detection monitor 74, the major axis or the radius of an elliptic track is changed so that the wavelength conversion optical axis may not pass through the position of the scattering light detected.

Figure 8:
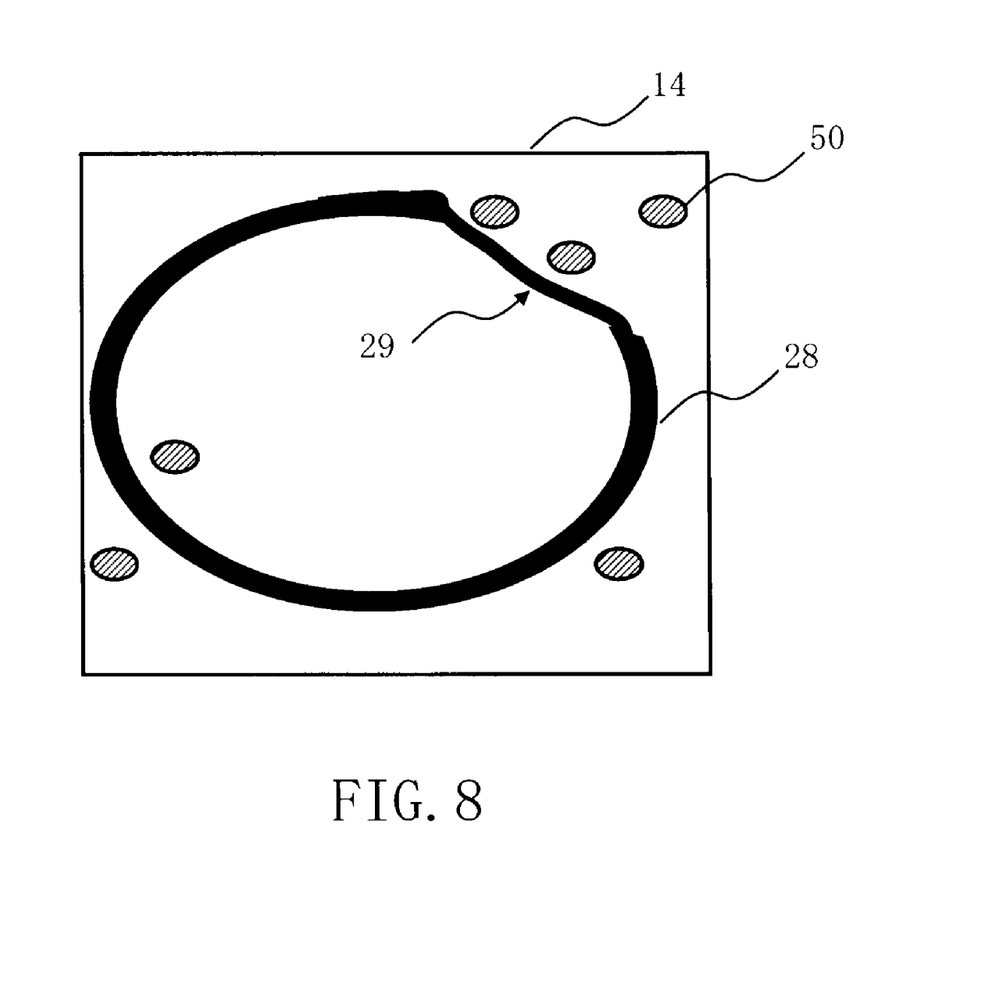
FIG. 8 shows an example of the track of an irradiated position according to Embodiment 3.

FIG. 8 shows an example of the track of an irradiated position according to Embodiment 3. As shown in FIG. 8, when the deteriorated portion 50 of the nonlinear crystal 14 is detected by the preceding probe light 71 to be on the track 28 of the irradiation position of the fundamental wave onto the nonlinear crystal 14, the track is changed to a track 29 so that the deteriorated portion 50 may be avoided. This change can be controlled by the movement of the y-axis stage 30 which moves the nonlinear crystal 14 in the y-axis direction by the drive of the y-axis motor 32 controlled by the control circuit 38, and by the movement of the x-axis stage 34 which moves the nonlinear crystal 14 in the x axis direction by the drive of the x-axis motor 36. By this operation, the portion where scattering occurred can be avoided.

In this example, in order to newly search a malfunction point in the crystal during the operation of the light source, a probe beam is prepared before the optical axis in the resonator passes through the crystal. Then, the track is changed as shown in FIG. 8 so that the portion judged to be malfunctioning by the probe beam may be avoided to continue the operation of the wavelength conversion light source. In the example of FIG. 7, a probe beam of a different wavelength is introduced from the backside of the bending mirror in the resonator.

Moreover, in the same structure as that of FIG. 7, it is also preferable to avoid a malfunction portion while checking a transparent wave surface by assembling an interferometer using a probe light. Such an algorithm is particularly effective when malfunction portions of the crystal are dotted as shown in FIG. 8.

As mentioned above, decrease of the wavelength converted output is avoidable by previously specifying a deteriorated portion by using a probe light.

Embodiment 4

In Embodiment 3, the case is described in which the function of specifying a deteriorated portion in advance by using a probe light is installed in the light source apparatus which performs wavelength conversion inside the resonator, and however, it is not limited to this. In Embodiment 4, there will be explained a structure in which a function of specifying a deteriorated portion in advance by using a probe light is installed in the structure which performs wavelength conversion outside the resonator. Embodiment 4 is the same as Embodiment 1 except for the points described below.

Figure 9:
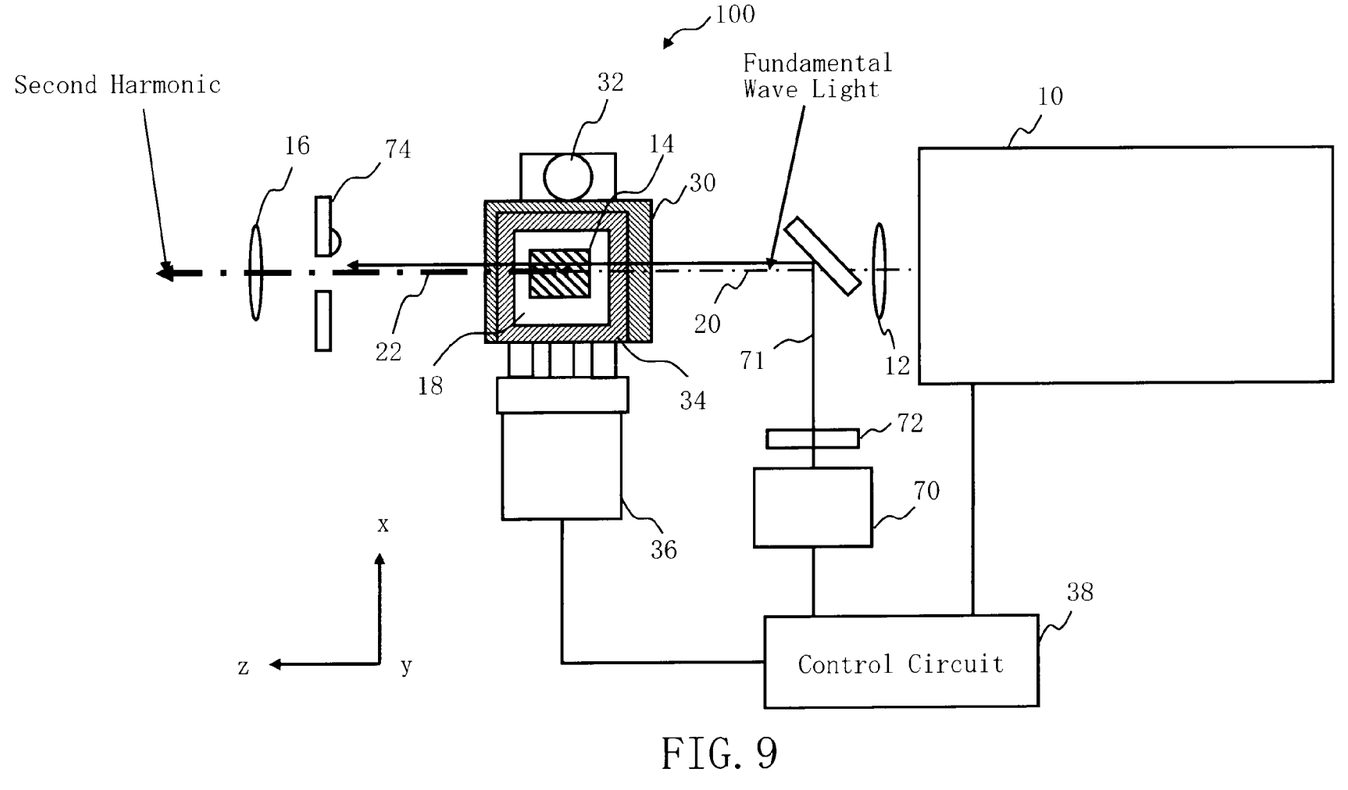
FIG. 9 is a schematic diagram showing the structure of a wavelength conversion light source apparatus according to Embodiment 4.

FIG. 9 is a schematic diagram showing the structure of a wavelength conversion light source apparatus according to Embodiment 4. In FIG. 9, the wavelength conversion light source apparatus 100 is the same as that in FIG. 1 except for further adding the probe light emission unit 70 (an example of a probe light source), the parallel plate 72, a probe light introducing mirror 76, and the scattering light detection monitor 74 to the structure of FIG. 1.

In Embodiment 4, similarly to Embodiment 3, the deteriorated portion 50 of the nonlinear crystal 14, where a wavelength converted output decreases, is specified by irradiating the probe light 71 onto the nonlinear crystal 14. The probe light 71 emitted from the probe light emission unit 70 passes through the parallel plate 72 and is reflected from the probe light introducing mirror 67 to irradiate the nonlinear crystal 14. When moving the nonlinear crystal 14, if the probe light 71 irradiates the deteriorated portion 50, the probe light 71 scatters a light to be detected by the scattering light detection monitor 74. Thus, the deteriorated portion 50, where the wavelength conversion characteristic decreases, can be specified by regarding the portion of the scattering light detected by the scattering light detection monitor 74 as the deteriorated portion 50. It should be understood that the probe light introducing mirror 67 makes the fundamental wave 20 pass to the nonlinear crystal 14 side.

Both the first and second methods explained in Embodiment 3 can also be applied to the structure shown in FIG. 9. Therefore, in Embodiment 4 as well as Embodiment 3, decrease of the wavelength converted output is avoidable by previously specifying a deteriorated portion by using a probe light.

In Embodiments 3 and 4, the case is described in which the deteriorated portion 50 is specified by detecting a scattering light by using the scattering light detection monitor 74, and it is also acceptable to discern a malfunction portion by preparing a partial reflecting mirror on optically the same axis in order to detect a change of crystal transmittance of a probe beam or a beam change.

Figure 10:
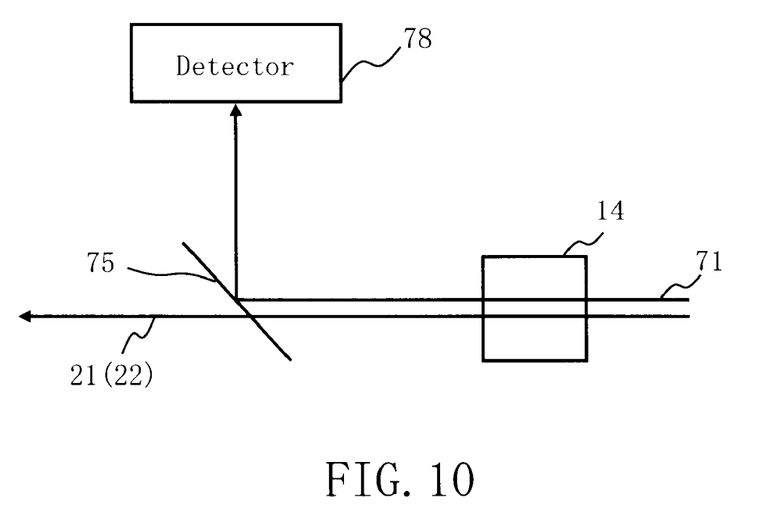
FIG. 10 is a schematic diagram showing a part of the structure of a wavelength conversion light source apparatus for explaining a method of detecting a malfunction by using a probe light.

FIG. 10 is a schematic diagram showing a part of the structure of a wavelength conversion light source apparatus for explaining a method of detecting a malfunction by using a probe light. A part of the probe light 71 is reflected by a partial reflecting mirror 75 arranged at the output side of the nonlinear crystal 14. Then, by monitoring a change of the crystal transmittance of the probe light 71 by using a detector 78 and regarding a portion where the crystal transmittance changes as the deteriorated portion 50, it is possible to specify the deteriorated portion 50 where the wavelength conversion characteristic decreases.

Alternatively, a transparent board arranged at a Brewster angle is placed as the partial reflecting mirror 75. This Brewster angle arrangement is P-polarized to the oscillator of the fundamental wave, and a resonator loss is large enough to be neglected. On the other hand, by using a probe light in S polarization to the Brewster angle arrangement, a high reflectance of 15% can be obtained, and the probe light 71 is introduced into the detector 78. By using a position sensor as the detector 78, transition of a beam can be discerned and a malfunction point of a refractive index can be detected. By using the detector 78 as a power monitor, change of a transmission power can be detected and transmittance of the nonlinear crystal can be monitored. Then, by regarding a portion of the refractive index malfunction point as a deteriorated portion, the deteriorated portion 50 where the wavelength conversion characteristic decreases can be pinpointed.

As mentioned above, according to each Embodiment, it is possible to move an irradiated position of the fundamental wave before the wavelength converted output temporally decreases and the surface of the nonlinear crystal incurs optical damage. Moreover, when shifting the irradiated position, it is possible to restore degradation inside the crystal produced by a previous irradiation. As a result, the life of the nonlinear crystal can be greatly extended.

Referring to specific examples, Embodiments have been described above. However, the present invention is not limited to these examples. For example, in FIGS. 6 and 7, although the output coupling mirror 64 is used as the left end mirror, it should be understood that another structure is also acceptable in which the output coupling mirror 64 is used as a high reflecting mirror and the probe light introducing mirrors 67 and 76 serve as an output coupler.

While description of the apparatus structure, control method, etc. not directly required for explaining the present invention is omitted, some or all of them may be suitably selected and used when needed.

In addition, any other wavelength conversion light source apparatus, wavelength conversion method, pattern inspection apparatus and method thereof that include elements of the present invention and that can be appropriately modified by those skilled in the art are included within the scope of the present invention.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wavelength conversion light source apparatus, comprising:
    a fundamental wave light source configured to emit a fundamental wave;
    a nonlinear crystal configured to convert a wavelength of the fundamental wave by being irradiated with the fundamental wave and making the fundamental wave pass therethrough;
    a movement unit configured to place the nonlinear crystal thereon and continuously move the nonlinear crystal within a plane, where a phase matching condition is not violated, so that a passage path of the fundamental wave passing through the nonlinear crystal is changed; and
    a probe light source configured to emit a probe light with a wavelength different from the wavelength of the fundamental wave,
    wherein the nonlinear crystal is irradiated with the fundamental wave at a first irradiation position and is irradiated with the probe light at a second irradiation position that precedes the first irradiation position in a movement pathway, at a same time, while the nonlinear crystal is moved,
    a potentially deteriorated portion of the nonlinear crystal, where a wavelength converted output decreases, is specified before the potentially deteriorated portion is irradiated with the fundamental wave, by passing the probe light through the second irradiation position of the nonlinear crystal, and
    the nonlinear crystal is moved, so that deterioration at the potentially deteriorated portion of the nonlinear crystal is avoided.

2. The apparatus according to claim 1, wherein the fundamental wave light source includes a resonator, and the nonlinear crystal is placed inside the resonator.

3. The apparatus according to claim 1, wherein the fundamental wave light source includes a resonator, and the nonlinear crystal is placed outside the resonator.

4. The apparatus according to claim 1, wherein the nonlinear crystal is moved so that the movement pathway of the first irradiation position of the fundamental wave irradiating the nonlinear crystal includes a curved line.

5. The apparatus according to claim 1, wherein the nonlinear crystal is moved so that the movement pathway of the first irradiation position of the fundamental wave irradiating the nonlinear crystal is a closed pathway having no end part.

6. The apparatus according to claim 1, wherein a moving speed of the nonlinear crystal is a speed at which power of the fundamental wave having a converted wavelength does not decrease.

7. The apparatus according to claim 1, wherein the movement unit includes an x-axis stage that moves the nonlinear crystal in an x-axis direction and a y-axis stage that moves the nonlinear crystal in a y-axis direction.

8. A wavelength conversion light source apparatus, comprising:
    a fundamental wave light source configured to emit a fundamental wave;
    a nonlinear crystal configured to convert a wavelength of the fundamental wave by being irradiation with the fundamental wave and making the fundamental wave pass therethrough;

a movement unit configured to place the nonlinear crystal thereon and move the nonlinear crystal by a distance equal to or less than a spot size of the fundamental wave per movement within a plane, where a phase matching condition is not violated, so that a passage path of the fundamental wave passing through the nonlinear crystal is changed; and a probe light source configured to emit a probe light with a wavelength different from the wavelength of the fundamental wave, wherein the nonlinear crystal is irradiated with the fundamental wave at a first irradiation position and is irradiated with the probe light at a second irradiation position that precedes the first irradiation position in a movement pathway, at a same time, while the nonlinear crystal is moved, a potentially deteriorated portion of the nonlinear crystal, where a wavelength converted output decreases, is specified before the potentially deteriorated portion is irradiated with the fundamental wave, by passing the probe light through the second irradiation position of the nonlinear crystal, and the nonlinear crystal is moved, so that deterioration at the potentially deteriorated portion of the nonlinear crystal is avoided.

9. The apparatus according to claim 8, wherein the fundamental wave light source includes a resonator, and the nonlinear crystal is placed inside the resonator.

10. The apparatus according to claim 8, wherein the fundamental wave light source includes a resonator, and the nonlinear crystal is placed outside the resonator.

11. The apparatus according to claim 8, wherein the nonlinear crystal is moved so that the movement pathway of the first irradiation position of the fundamental wave irradiating the nonlinear crystal includes a curved line.

12. The apparatus according to claim 8, wherein the nonlinear crystal is moved so that the movement pathway of the first irradiation position of the fundamental wave irradiating the nonlinear crystal is a closed pathway having no end part.

13. The apparatus according to claim 8, wherein a moving speed of the nonlinear crystal is a speed at which power of the fundamental wave having a converted wavelength does not decrease.

14. The apparatus according to claim 8, wherein a part of the potentially deteriorated portion produced inside the nonlinear crystal is irradiated with an energy that is weaker than a radiating energy of the fundamental wave.

15. The apparatus according to claim 14, wherein the potentially deteriorated portion is restored through self-annealing, when the potentially deteriorated portion is deteriorated.

16. A wavelength conversion method comprising:
converting a wavelength of a fundamental wave by irradiating a nonlinear crystal with the fundamental wave and by making the fundamental wave pass through the nonlinear crystal;

while the nonlinear crystal is irradiated with the fundamental wave, continuously moving the nonlinear crystal within a plane, where a phase matching condition is not violated, so that a passage path of the fundamental wave passing through the nonlinear crystal is changed;

irradiating the nonlinear crystal i with the fundamental wave at a first irradiation position and irradiating the nonlinear crystal with a probe light having a wavelength different than the fundamental wave at a second irradiation position, that precedes the first irradiation position in a movement pathway, at a same time, while the nonlinear crystal is moved; and specifying a potentially deteriorated portion of the nonlinear crystal, where a wavelength converted output decreases, before the potentially deteriorated portion is irradiated with the fundamental wave, by passing the probe light through the second irradiation position of the nonlinear crystal, wherein the nonlinear crystal is moved, so that deterioration at the potentially deteriorated portion of the nonlinear crystal is avoided.

17. The method according to claim 16, wherein the continuously moving includes moving the nonlinear crystal in at least one of an x-axis direction and a y-axis direction.

18. A wavelength conversion method comprising:
converting a wavelength of a fundamental wave by irradiating a nonlinear crystal with the fundamental wave and by making the fundamental wave pass through the nonlinear crystal; and while the nonlinear crystal is irradiated with the fundamental wave, moving the nonlinear crystal by a distance equal to or less than a spot size of the fundamental wave per movement within a plane, where a phase matching condition is not violated, so that a passage path of the fundamental wave passing through the nonlinear crystal is changed, irradiating the nonlinear crystal with the fundamental wave at a first irradiation position and irradiating the nonlinear crystal with a probe light having a wavelength different than the fundamental wave at a second irradiation position, that precedes the first irradiation position in a movement pathway, at a same time, while the nonlinear crystal is moved; and specifying a potentially deteriorated portion of the nonlinear crystal, where a wavelength converted output decreases, before the potentially deteriorated portion is irradiated with the fundamental wave, by passing the probe light through the second irradiation position of the nonlinear crystal, and wherein the nonlinear crystal is moved, so that deterioration at the potentially deteriorated portion of the nonlinear crystal is avoided.

19. The method according to claim 18, wherein a part of the potentially deteriorated portion produced inside the nonlinear crystal is irradiated with an energy that is weaker than a radiating energy of the fundamental wave.

20. The method according to claim 19, wherein the potentially deteriorated portion is restored through self-annealing, when the potentially deteriorated portion is deteriorated.

* * * * *